Figure 1:
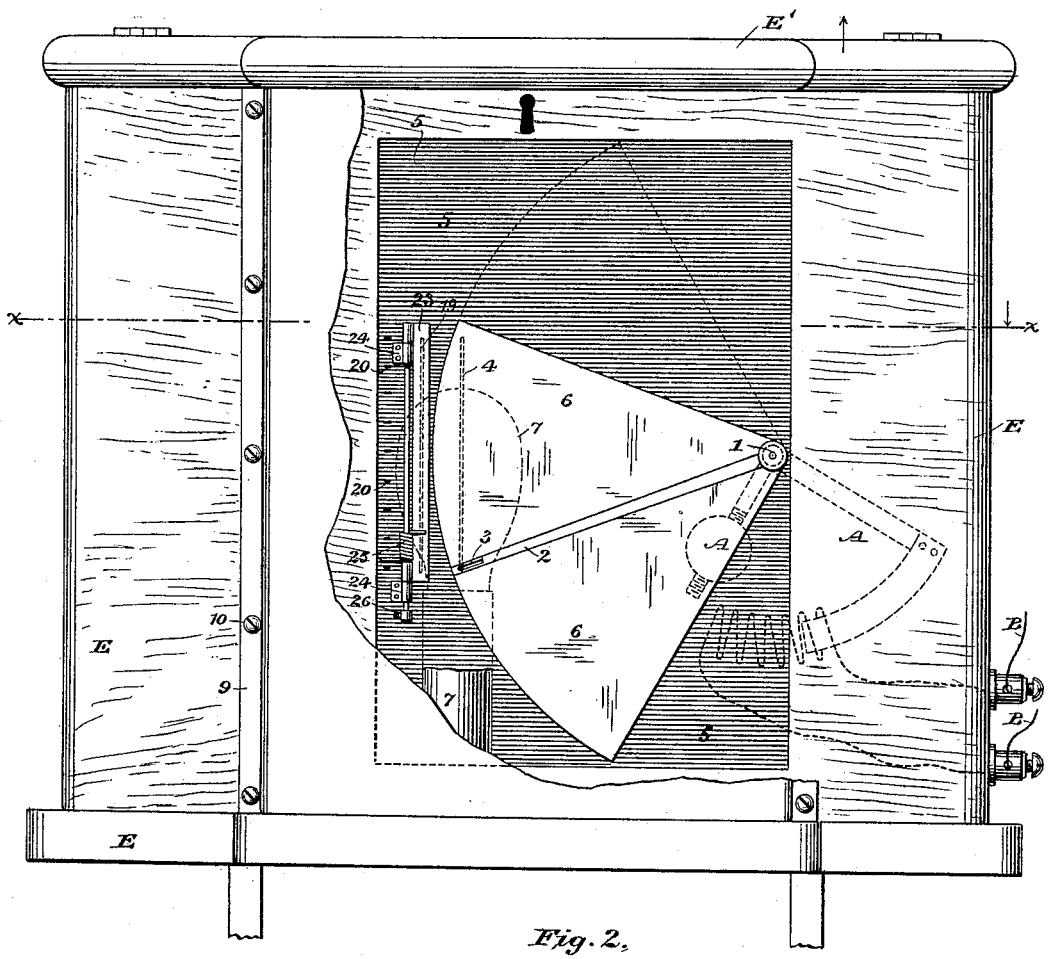

(No Model.) 2 Sheets—Sheet 1.

G. W. WALKER.
RECORDING APPARATUS FOR ELECTRIC METERS.

No. 406,678. Patented July 9, 1889.

Witnesses
Geo. W. Breck
Edward Thorpe

Inventor
George W. Walker,
By his Attorney
Jacob Felbel.

(No Model.) 2 Sheets—Sheet 2.
G. W. WALKER.
RECORDING APPARATUS FOR ELECTRIC METERS.
No. 406,678. Patented July 9, 1889.
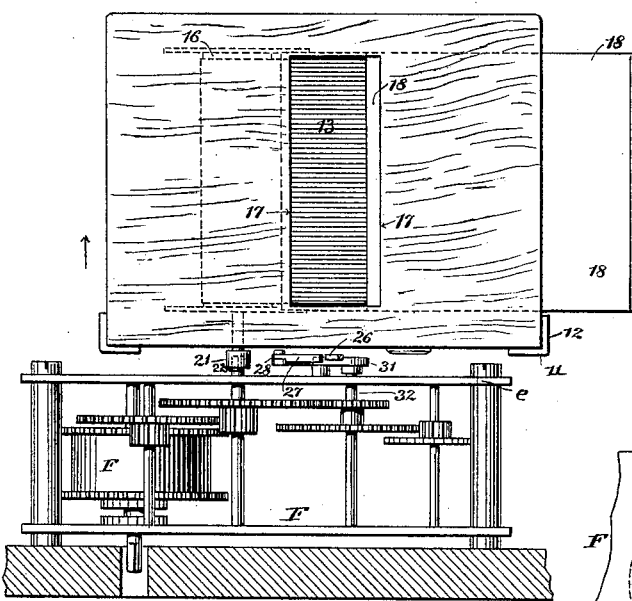
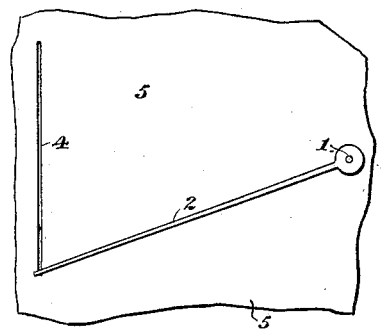
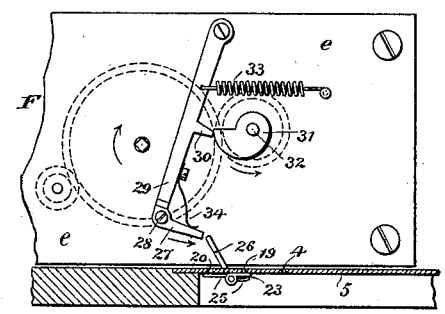
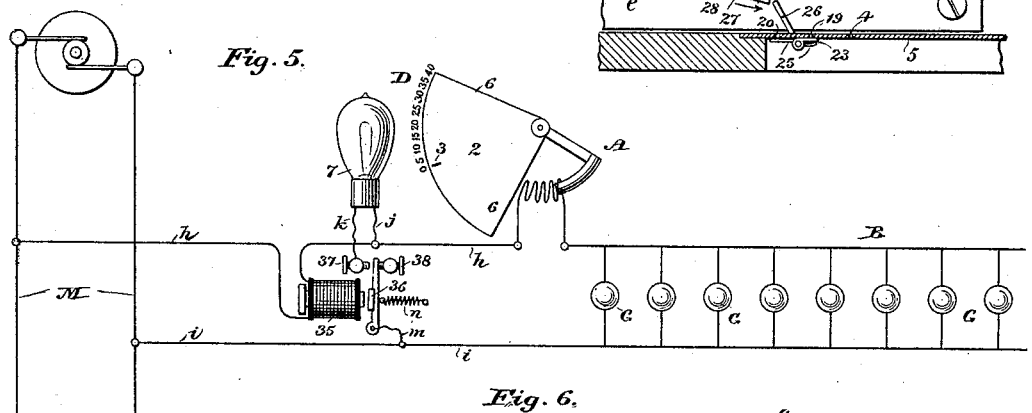
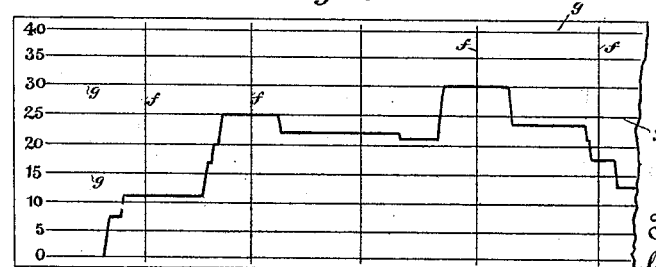
Witnesses
Geo. W. Breck
Edward Thorpe
Inventor
George W. Walker
By his Attorney
Jacob Felbel

UNITED STATES PATENT OFFICE.

GEORGE W. WALKER, OF NEW YORK, N. Y.

RECORDING APPARATUS FOR ELECTRIC METERS.

SPECIFICATION forming part of Letters Patent No. 406,678, dated July 9, 1889.

Application filed March 9, 1889. Serial No. 302,650. (No model.)

*To all whom it may concern:*

Be it known that I, GEORGE W. WALKER, a citizen of the United States, and a resident of New York, in the county of New York and State of New York, have invented certain new and useful Improvements in Recording Apparatus for Electric Meters, of which the following is specification.

My invention relates more especially to means for recording the actions of an electrical measuring-instrument, and has for its main objects simplicity of construction and accuracy of operation.

As my improvements have been designed more particularly for recording the different quantities of current used in a given time in an electric-light circuit, I have illustrated my invention in connection with an ammeter and a system of electric lighting, although my improvements may be equally well employed in conjunction with a voltmeter or other electric measuring-instrument.

The primary feature or basis of my invention rests in the procuration of a photographic impression or copy of the fluctuations or variations of the movable or indicating part of the measuring-instrument. I am aware, however, that photography has heretofore been used to record the vibrations of a galvanometer-needle or current-indicator; but the construction and arrangement of the apparatus having been complex and the operation unreliable, inaccurate, or incomplete, the art of photography has not hitherto been brought into practical or commercial use for the purpose of recording the movements of an electrical measuring-instrument.

In the carrying out of my improvements I employ an electric meter, an electric lamp or other source of light, a strip or sheet of paper or other substance or material sensitive to light, and clock-work or other motive power for feeding or advancing the sensitized substance. The needle, vibratory arm, or indicating portion of the meter moves over a slot or opening formed in a plate or partition located between the lamp or source of light and the moving sensitized substance, and causes to be made upon the latter a photographic impression or line. The dividing-plate is also formed with a second slot, for which is provided a shutter that is operated at predetermined times to admit light for the purpose of making transverse lines or divisions upon the sensitized material, and said dividing-plate is furthermore formed or provided with a series of apertures or perforations for the constant admission of light upon the traveling sensitized surface for the purpose of producing thereon a series of longitudinal lines or divisions. The sensitized substance is arranged within a case or box, and by the clock-movement is adapted to travel from one roller or spool to another. This box is removably fitted to the clock-movement, is arranged within a frame or covering to the whole instrument or apparatus, and is provided with a slide or lid for excluding light from the sensitized material when the box is detached from the clock-movement and removed from the apparatus for the purpose of developing the photographic impressions.

Other features of novelty are also provided, all as will be hereinafter more fully described, and particularly pointed out in the appended claims.

Figure 2:
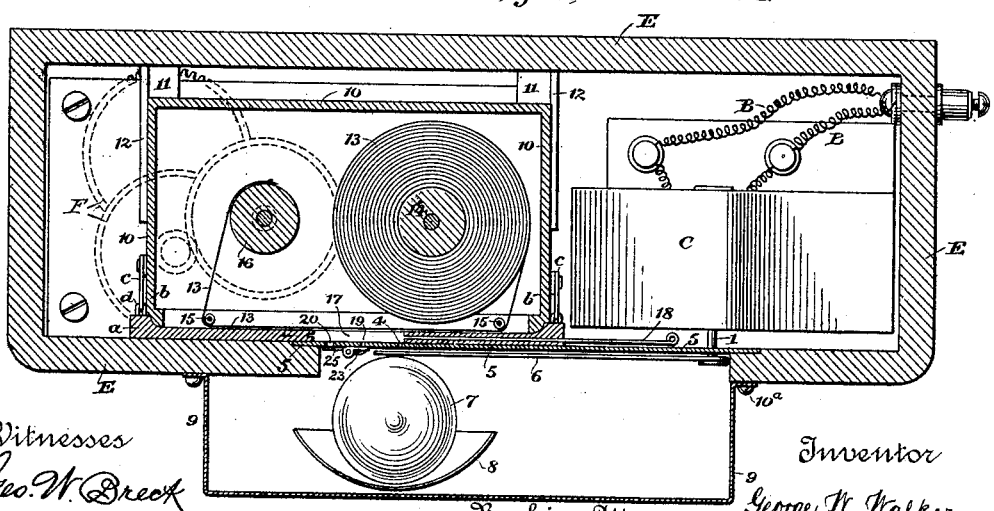

In the accompanying drawings, forming a part of this specification, Figure 1 is a front elevation of an apparatus embodying my invention, a portion of the outside casing being broken away to afford a view of some of the interior working parts. Fig. 2 is a horizontal section taken at the line $x\,x$ of Fig. 1. Fig. 3 is a front elevation of the clock-work and the box containing the sensitized material detached. Fig. 4 is a horizontal section to show the means employed for periodically actuating the shutter, the box of sensitized paper being removed. Fig. 5 is a diagrammatical view illustrating part of my invention. Fig. 6 is a fragmentary view of the sensitized material after development and bearing a record of the changes in the meter. Fig. 7 is a view of a modification of my invention.

In the several views the same part will be found designated by the same letter or numeral of reference.

A designates an ammeter, which, as seen, is included in an electric circuit B and contained within a case or box C. The ammeter A illustrated is of well-known construction, and does not require any specific description. In lieu of the same any other suitable form or construction of ammeter may be employed. Extending from the axis of vibration 1 of the meter is an arm or needle 2, Fig. 1, whose free end is arranged to swing before a graduated scale fixed or marked upon some stationary part of the machine. At Fig. 5 the said scale is shown, and is designated by the letter D. The needle at or near its free end is provided with an elongated hole or opening 3, which vibrates in front of a long straight slot 4 in a partition or plate 5, secured, preferably, in a vertical position in a box or casing E. On each side of the needle is arranged a shield 6, preferably in the form of a sector, for a purpose to be presently explained.

Instead of the construction shown at Fig. 1, that illustrated at Fig. 5 may be adopted, wherein the shields and the needle are made of a single piece and perforated to form the elongated eye 3.

In front of the needle and shields is arranged a light, preferably an incandescent lamp 7, provided, preferably, with a reflector 8. A cover 9, screwed at $10^a$ to the casing E, is preferably placed in front of the lamp. This cover may be provided with a glass face to permit visual observation of the dial or scale D and the needle for the purpose of ascertaining the state of the meter at any desired time.

Within the casing E and back of the plate 5 is arranged a box 10, which rests upon horizontal supports 11, fixed to the casing, and which is held and guided laterally by vertical flanges 12, formed integral with the supports. The said box 10 is designed to contain the sensitized material and to be removable from the casing. The sensitized material may be composed of any suitable substance prepared in any known or suitable way. By preference I employ the well-known bromide paper. This paper, designated by the numeral 13, is wound in a coil upon a roll or spool 14, mounted to rotate in the box 10. The outer end of the coiled ribbon or band of paper passes around guideposts or rollers 15 15 at the front of the box and is fastened to another spool or roll 16 within the box. The front of the box is cut away or formed with a large rectangular opening 17 to expose the paper to the light from the lamp 7 when the box 10 is within the casing E and the apparatus is in operation. A slide or cover 18 is provided to close the opening 17, in order to effectually prevent the admission of any light to the sensitized paper when the box is removed from the casing for the purpose of developing or fixing the photographic impressions upon the paper. In order to conveniently insert and remove the sensitized paper, the front $a$ of the box is detachably connected to the sides $b$ by means of hooks and eyes $c$ and $d$.

The opening 17 in the front $a$ of the box is made sufficiently wide and long to encompass the slot 4 in the dividing-plate 5, as well as a similar parallel slot 19, and a series of perforations 20 also made in said plate for the purpose of admitting light to the sensitized paper through said slots and perforations.

Beneath the box 10 is arranged a suitable motor—preferably clock-work F—for feeding the sensitized paper or for winding it from the spool 14 to that marked 16. The axis of the latter spool extends below the bottom of the box 10 and is formed or provided with a hub 21, having a square or angular socket or depression for the reception of the square or angular protruding extremity 22 of one of the shafts of the wheel-work. This makes a simple and effective connection between the driving-power and the paper to be fed, which may be readily and instantly broken when it is desired to remove the box containing the paper from the apparatus.

The slot 19 is normally covered by a shutter 23, which is hinged or pivoted at 24 to the plate 5, and which is provided with a spring 25, for a purpose which will presently appear. This shutter is designed to be automatically operated at given periods of time to permit the passage of light through the slot 19 to obtain effects upon the sensitized paper. For this purpose the lower end of the shutter is provided with an arm or projection 26, that is engaged by a finger 27, connected at 28 to an arm or lever 29 by a knuckle-joint. The arm or lever 29 is pivoted or fulcrumed upon the top plate $e$ of the clock-work, and is provided with a lug 30, with which co-operates a cam 31, secured upon the upper end of the shaft 32 of the wheel movement. A spiral spring 33 is provided for maintaining the lever in engagement with the cam at all times, and a flat spring 34 is provided for keeping the finger 27 in such relation to the projection 26 as that it may in one direction of movement engage with or actuate the same and raise the shutter, so as to uncover the slot 19.

By periodically admitting light through the slot 19 the sensitized paper is marked transversely, as indicated by the lines $f$ at Fig. 6, and hence is divided into known or given periods of time.

The series of perforations 20 are always open for the passage of the light, and by this means the paper is marked or ruled longitudinally, as indicated by the parallel horizontal lines $g$ at Fig. 6. These perforations 20 are preferably calibrated from or located with reference to the graduations of the scale D. The lines $g$ represent current values corresponding to the scale D, and may be divided into periods of five, as shown, or otherwise. In the chart or plan shown at Fig. 6 there are nine lines $g$, the lowermost being marked naught or zero, the next 5, the next 10, and so on to the uppermost one, which is numbered 40. These lines, in the present instance, are intended to signify ampères of current.

The straight or rectilinear slot 4 co-operates with the elongated eye or opening 3, formed in the needle or indicating part of the meter for the admission of light to the sensitized paper, and the shields 6 on either side of the eye 3 are made of such width as to cover at all times all that portion of the slot 4 not in register with the eye 3, so as to prevent the entrance of any light to the sensitized paper except through the said eye. If the eye be at zero, the upper shield 6 excludes the light from every part of the slot 4 excepting at that locality, and if the eye be at 40 the lower shield intercepts the light below that point, while between the extremes of the slot both shields come into play. It will be observed that the eye 3 is elongated or made of such length as that it may always coincide with the straight slot 4, no matter what the extent of vibration of the part 2 may be.

The lamp 7 is preferably included in the circuit B, as illustrated at Fig. 5, and is preferably arranged to be lighted only when one or more of the lamps G (or other translating devices) may be in use. To effect this desideratum, I place in the circuit an electro-magnet 35 and a spring-controlled armature 36, which vibrates between a contact 37 and a stop 38. From one wire of the main line M extends one wire $h$ of the circuit B, which, passing through the electro-magnet and the meter, connects with the lamps G, and from the other wire of the main line extends another wire $i$, which also connects to the lamps G, as usual. The lamp 7 is connected by a wire $j$ to the wire $h$ and by a wire $k$ to the contact 37, while the armature is connected to the conductor $i$ by a wire $m$. The armature-spring is marked with the letter $n$, and operates to hold the free end of the armature against the contact or stop 38 when all of the lamps G are out or in disuse. The instant, however, a connection is made at any of the lamps G the magnet is energized and the free end of the armature is drawn over to touch the contact 37. This immediately throws the lamp 7 into the circuit, causing it to become incandescent and to produce the necessary light for photographing the movements of the needle or arm of the meter.

Before the ignition of the lamp 7 the needle or indicating part of the meter stands at zero; but as soon as said lamp 7 is ignited (which, as explained, cannot occur until one or more of the lamps G are put into operation) the needle of the meter moves a distance on the scale D corresponding with the quantity of current being consumed. The movements of the needle will of course vary, in accordance with the number of lamps in use, and hence will vibrate back and forth irregularly in front of the slot 4. This vibration is photographed instantly and accurately upon the traveling band of sensitized paper, and thus a positive record or representation of the same is secured.

The clock-movement is geared to feed the sensitized paper at any desired speed—say about one inch per hour. As the paper is wound upon the spool 16 and the diameter thereof is thus increased, the paper will move before the slot 4 at a slightly-increased speed; but this is immaterial on account of the employment of the slot 19 and the shutter, whereby at predetermined times the lines $f$ may be made without regard to the rate of travel of the paper. I prefer to photograph the paper transversely at each hour; but I may hereafter elect to mark it thus in periods of time greater or less than one hour.

The sensitized paper may be of such a length as to require one month or more to be wound from one spool to the other. Just previous to the expiration of that time the lid E' of the casing may be unlocked and opened by some person in authority, (as a company's collector or inspector,) the slide 18 pushed in over the opening 17, and the box 10 with its inclosed paper removed from the apparatus and carried to a suitable place for the development of the photographic impressions. At the same time another box with a fresh roll of sensitized paper may be substituted for that removed, so as to leave no appreciable break in the recording of the current used.

The photograph may be developed in the usual manner, and when the impressions have been fixed the amount of current used within the given period of time may be readily read or ascertained.

At Fig. 6 is represented a developed chart, from which it will be observed that during the first hour about eight ampères of current were used for a few minutes, and about eleven ampères for about fifteen minutes; that during the second hour eleven ampères continued to be used for about half an hour, when during the next ten minutes or so the current was increased in quantity to twenty-five ampères; that during the third hour twenty-five ampères were used for about fifteen minutes, and thereafter only twenty-three ampères were used, and so forth. Thus the quantity of current passing through the meter during the hour, day, week, or month may be conveniently ascertained and properly charged to the consumer.

In the manner which I have shown my invention carried out the cam 31 is timed to make one revolution in one hour, during which time it gradually forces the arm or lever 29 to the left against the tension of the spring 33. At the end of the hour the rise or cam proper passes by the lug 30, and the spring 33 pulls the lever quickly toward the left, during which movement the finger 27 strikes the projection 26 and opens the shutter. When the finger 27 has in moving in this direction passed by or parted company with the arm 26, the spring 25 instantly closes the shutter. As the cam pushes the lever 29 to the left again, the finger 27 rides over the projection 26 against the force of the spring 34. The joint 28 is such that the finger is free to vibrate upwardly in returning past the projection 26, but is held rigidly when swinging in the direction of the arrow at Fig. 4.

In the modification shown at Fig. 7 the eye or aperture 3 is omitted from the needle 2, and the shields 6 6 are also dispensed with. The light from the lamp 7 being cut off by the needle as it fluctuates, the sensitized paper will not be affected at those portions covered by the needle; but all other portions of the paper will be exposed to the light and will be acted upon thereby; hence, when the paper is developed, instead of obtaining a chart with a white ground and black record, as shown at Fig. 6, there will be obtained a black ground with a white record.

I have herein shown my invention carried out in the best forms now known to me; but, appreciating the fact that innumerable changes in detail construction and arrangement may be made without departing from the spirit of my invention, I desire it to be understood that I do not limit myself to precisely what I have shown and described, nor do I limit myself to an apparatus containing all the several features of my improvements, for some of them may be used without others in a contrivance varying in general plan of construction.

Although I have shown my invention employed in connection with an ammeter, I do not limit myself to the same, for my improvements are adapted to be used in combination with any other kind or character of electrical measuring-instrument just as well, the gist of my invention consisting in providing suitable means, as will presently be set forth in the claims, for recording conveniently and accurately the vibrations, reciprocations, or fluctuations of the movable or current indicating portion of an electrical measuring-instrument, be it a needle, arm, plate, or other device.

I am aware of the patent granted January 5, 1886, No. 333,779, to W. C. Patterson, and am the owner of the same and the invention thereby secured.

What I claim as new, and desire to secure by Letters Patent, is—

1. The combination of a source of light, a substance sensitive to light, and a partition having a straight slot with an electric meter whose indicating part is provided with an elongated eye.

2. The combination of a source of light, a substance sensitive to light, and a partition having a slot, with an electric meter whose indicating part is provided with an eye and shields on the right and left thereof equal each in size to the length of the slot in the partition.

3. The combination, with the vibratory or indicating part of an electric meter, of a source of light, a sensitized substance, a motor for feeding the same, a partition provided with two slots, and a shutter governing one of said slots.

4. The combination, with the vibratory or indicating part of an electric meter, of a source of light, a sensitized substance, a motor for feeding the same, a partition provided with two slots, a shutter governing one of said slots, and means for opening and closing said shutter at predetermined periods of time.

5. The combination, with the vibratory or indicating part of an electric meter, of a source of light, a sensitized substance, a motor for feeding the same, a partition provided with two slots, a shutter provided with an arm and a spring, a lever, a cam for actuating said lever, and a clock-movement for rotating said cam.

6. The combination, with an electric meter, of a source of light, a sensitized substance, mechanism for feeding the same, and a partition provided with a series of apertures for effecting longitudinal ruling of the sensitized substance.

7. The combination, with an electric meter, of a source of light, a sensitized substance, mechanism for feeding the same, a partition provided with a series of perforations and a slot, a shutter for said slot, and means for opening and closing said shutter, whereby the sensitized substance may be ruled longitudinally and transversely.

8. The combination, with the vibratory or indicating part of an electric meter, of a source of light, a sensitized substance, mechanism for feeding the same, a partition provided with a series of perforations and two slots, a shutter for one of said slots, and means for opening and closing said shutter, whereby the sensitized substance may be ruled longitudinally and transversely and may also receive photographic representations or impressions corresponding to the fluctuations of the vibratory or indicating part of the measuring-instrument.

9. The combination, with the vibratory or indicating part of an electric meter, of a sensitized substance, an electric lamp for affecting said substance, an electric circuit including said meter, said lamp, and translating devices, and means, substantially as described, for extinguishing the light of said lamp when all of said translating devices have been disconnected or thrown into disuse.

10. The combination, with the vibratory or indicating part of an electric meter, of a sensitized substance, an electric lamp for affecting said substance, an electric circuit, translating devices, an electro-magnet, and a circuit-closer, whereby the said lamp is adapted to be lighted as soon as one (or more) of said translating devices is put into use.

11. The combination, with the vibratory or indicating part of an electric meter, of a suitable casing, a source of light, a box or compartment removably fitted within said casing, a sensitized substance within said box, and means for feeding said sensitized substance.

12. The combination, with an electric meter, of a suitable casing, a source of light, a clock-movement, a box removably connected to said clock-movement, and a strip or ribbon of sensitized materal within said box adapted to be fed by said clock-movement.

Signed at New York, in the county of New York and State of New York, this 6th day of March, A. D. 1889.

GEORGE W. WALKER.

Witnesses:
GEO. W. WEIFFENBACH,
JACOB FELBEL.